United States Patent
Pollmann-Retsch et al.

(10) Patent No.: US 8,217,593 B2
(45) Date of Patent: Jul. 10, 2012

(54) METHOD AND DRIVING UNIT FOR DRIVING A GAS-DISCHARGE LAMP

(75) Inventors: Jens Pollmann-Retsch, Aachen (DE); John-john Pieter Jan Van Den Bergh, Turnhout (BE); Uwe Mackens, Aachen (DE); Pavel Pekarski, Aachen (BE); Mark Carpaij, Aachen (DE); Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 87 days.

(21) Appl. No.: 12/667,394

(22) PCT Filed: Jul. 8, 2008

(86) PCT No.: PCT/IB2008/052744
§ 371 (c)(1),
(2), (4) Date: Jun. 8, 2010

(87) PCT Pub. No.: WO2009/007914
PCT Pub. Date: Jan. 15, 2009

(65) Prior Publication Data
US 2010/0244718 A1 Sep. 30, 2010

(30) Foreign Application Priority Data

Jul. 10, 2007 (EP) .................................. 07112156
Dec. 21, 2007 (EP) .................................. 07123984

(51) Int. Cl.
*H05B 37/02* (2006.01)
(52) U.S. Cl. .................. 315/307; 315/224; 315/246

(58) Field of Classification Search .............. 315/137, 315/224, 246, 287, 291, 307, 308
See application file for complete search history.

(56) References Cited

U.S. PATENT DOCUMENTS 5,463,281 A * 10/1995 Linssen .................. 315/209 R
5,608,294 A * 3/1997 Derra et al. .................. 315/224
(Continued)

FOREIGN PATENT DOCUMENTS
DE 102005049582 A1 4/2007
(Continued)

*Primary Examiner* — Tung X Le (57) ABSTRACT

In this method an arc-length control value, indicating the current length of a discharge arc of the gas-discharge lamp (1), is monitored and the lamp (1) is driven in a first operation mode (OMP) with a first current wave-shape when the arc-length control value indicates that the arc-length is higher than a switching threshold, which first current wave-shape is selected to result in a tip (31) growing on an electrode (30) of the lamp (1), and the lamp (1) is driven in a second operation mode (OMn) with a second current wave-shape when the arc-length control value indicates that the arc-length is lower than a switching threshold, which second current wave-shape is selected such that the tip (31) on the electrode (30) is at least partly melted back. In this method an operating frequency of the lamp is switched from a first frequency value (fi) to a second frequency value (f2), which second frequency • (f 2) value is higher than the first frequency value (fi)', if a first time criterion pertaining to a duration of driving of the lamp (1) in the second operation mode (OMn) is fulfilled and the operating frequency is switched from the second frequency value (f2) to the first frequency value (fi), if a second time criterion pertaining to a duration of driving of the lamp (1) in the first operation mode (OMP) is fulfilled.

14 Claims, 8 Drawing Sheets

U.S. PATENT DOCUMENTS

| | | | |
|---|---|---|---|
| 5,932,976 A * | 8/1999 | Maheshwari et al. | 315/291 |
| 6,225,754 B1 * | 5/2001 | Horiuchi et al. | 315/246 |
| 6,518,712 B2 * | 2/2003 | Weng | 315/209 R |
| 6,815,907 B2 | 11/2004 | Riederer | |
| 6,963,176 B2 * | 11/2005 | Onishi et al. | 315/291 |
| 7,170,237 B2 * | 1/2007 | Suzuki et al. | 315/246 |
| 2006/0022613 A1 | 2/2006 | Suzuki et al. | |
| 2007/0273304 A1 * | 11/2007 | Greenwood et al. | 315/307 |

FOREIGN PATENT DOCUMENTS

| | | |
|---|---|---|
| WO | 9511572 A1 | 4/1995 |
| WO | 2005062684 A1 | 7/2005 |
| WO | 2006016335 A1 | 2/2006 |
| WO | 2008053428 A1 | 5/2008 |

* cited by examiner

| Operating time / h | Time-portion close to voltage limit / % | # of mode-switches | # of frequency switches | Ratio frequency switches to mode-switches |
|---|---|---|---|---|
| 150 | 86 | 12433 | 9 | $7 \times 10^{-4}$ |
| 100 | 87 | 10591 | 1 | $9 \times 10^{-5}$ |
| 120 | 88 | 12845 | 15 | $1 \times 10^{-3}$ |

METHOD AND DRIVING UNIT FOR DRIVING A GAS-DISCHARGE LAMP

FIELD OF THE INVENTION

This invention relates to a method of driving a gas-discharge lamp, especially a high pressure gas-discharge lamp, with an alternating current. Furthermore, the invention relates to a driving unit for driving a gas-discharge lamp according to such a method. The invention also relates to an image rendering system, particularly a projector system, comprising a gas-discharge lamp and such a driving unit.

BACKGROUND OF THE INVENTION

In many applications, in particular in projection systems, there is a need for light sources which are as small as possible while providing a high light-flux. Therefore, in recent years, high pressure gas-discharge lamps such as HID (High Intensity Discharge) or UHP (Ultra High Performance) lamps have become the preferred choice for such applications because of the small distance between the electrodes and the correspondingly short arc-length and high brightness. A stable arc-length is of utmost importance for the use of short arc HID-lamps in projection applications since a constant light flux is desired. Especially for the new ultra-short-arc versions of UHP, the flux-maintenance in modern projectors largely depends on sustaining short arc lengths for prolonged times. Measures typically employed to maintain the arc-length include electrode design and lamp driving schemes. In principle, lamp driving schemes stabilize the arc-length by an essentially controlled growing and melting of structures on the lamp's electrodes.

For example, in WO 2005/062684, a method is proposed in which specific combinations of different current wave-shapes and operating frequencies are used. In a first mode of operation, this is substantially achieved by means of a known block shape of the lamp current upon which current-pulses are superimposed, directly preceding a commutation of the current. In this first operation mode, the lamp is always driven with a low frequency. In a second mode of operation, the thin tip growing on the electrode end always has a molten front structure, even if the lamp current is free of current-pulses. In this second operation mode, the lamp is always driven at a higher frequency. A third mode of operation is chosen such that the electrode tip to be melted back is necessarily in the molten state. A disadvantage of this existing method is that it leads to frequent changes of the operating frequency of the lamp. Besides occasionally having a negative effect on arc-stability, such frequency changes also complicate the use of this type of lamp in modern projectors, where often the control of the display has to be synchronized to the operating frequency of the lamp. On the other hand, arc-stability issues sometimes make inevitable such changes in the operating frequency.

SUMMARY OF THE INVENTION

Therefore, it is an object of the present invention to provide an improved method of and a driving unit for driving a gas-discharge lamp, leading to a reduction in the rate of change of the operating frequency, while at the same time ensuring a stable arc-length of the discharge.

To this end, the present invention provides a method of driving a gas-discharge lamp with an alternating current, whereby an arc-length control value, indicating the current length of a discharge arc of the gas-discharge lamp is monitored and whereby the lamp is driven in a first operation mode with a first current wave-shape when the arc-length control value indicates that the arc-length is higher than a switching threshold, which first current wave-shape is selected to result in a tip growing on an electrode of the lamp, and the lamp is driven in a second operation mode with a second current wave-shape when the arc-length control value indicates that the arc-length is lower than a switching threshold, which second current wave-shape is selected such that the tip on the electrode is at least partly melted back. The switching thresholds for the two switching-directions (first current wave-shape→second current wave-shape; second current wave-shape→first current wave-shape) may be different, whereby the switching threshold for the switching-direction from the first current wave-shape to the second current wave-shape has to be lower than the other switching threshold, but may also have the same value. If the two switching thresholds have different values, a "switching hysteresis" will occur. Then, at arc-lengths that lie between the two switching thresholds, the actual current wave-shape that is used for operating the lamp also depends on the previous history of the lamp. In a preferred embodiment of the invention, the switching thresholds for either switching-directions have the same value. Therefore, without restricting the invention in any way, a single threshold is assumed in the following, unless explicitly otherwise stated. In this method an operating frequency of the lamp is switched from a first frequency value to a second frequency value, which second frequency value is higher than the first frequency value, if a first time criterion pertaining to a duration of driving of the lamp in the second operation mode is fulfilled, and the operating frequency is switched from the second frequency value to the first frequency value, if a second time criterion pertaining to a duration of driving of the lamp in the first operation mode is fulfilled.

The first current wave-shape may, for example, be such that it exhibits an intentional current-pulse directly preceding a current-commutation time instant. This additional pulse, which is superimposed on the "standard" block current wave-shape results in a small tip growing on an electrode of the lamp, usually on a front face of the electrode. This tip stabilizes the arc and may prevent arc flickering. The pulse is therefore often known by those skilled in the art as an "anti-flutter-pulse". It is not absolutely necessary to apply such a pulse before each commutation, for example using every tenth commutation is sufficient. The second current wave-shape does not exhibit such an "anti-flutter-pulse", or the pulse is not superimposed on the current preceding the commutation time instant, but appears, for example, in the first half of a current half-period. This results in a melting of the tips on the electrode's front face.

Using this driving scheme, arc-stabilization is primarily achieved by changes in the current wave-shape. But, instead of changing of the operating frequency without regard to the actual state of the lamp, as is the case in the methods applied up to now, in the method according to the invention, time criteria are monitored regarding the duration of driving of the lamp in the first or second operation mode. The operating frequency of the lamp is only changed when fulfillment of the respective time criterion indicates that a change in operation frequency is advisable in order to avoid any arc instabilities.

With the method according to the invention, arc stabilization, at least as good as that delivered by the existing methods, can be achieved. However, this favourable arc stabilization is achieved while avoiding unnecessary frequency-changes, thus facilitating the synchronization of such lamps with time-sequential projection displays. In many cases, the arc stabilization even surpasses the existing methods, both axially (<10

μm) and laterally, by avoiding the extensive growing and melting of structures on the electrodes.

A corresponding driving unit for driving a gas-discharge lamp comprises a commutation unit for applying an alternating current to the gas-discharge lamp, a current-forming unit for forming the current wave-shape applied to the gas-discharge lamp, an arc-length monitoring unit, for monitoring an arc-length control value, indicating the current length of a discharge arc of the gas-discharge lamp, and a control unit. This control unit controls the current-forming unit such that the lamp is driven in a first operation mode with a first current wave-shape when the arc-length control value indicates that the arc-length is higher than a switching threshold, which first current wave-shape is formed to result in a tip growing on an electrode of the lamp, and that the lamp is driven in a second operation mode with a second current wave-shape when the arc-length control value indicates that the arc-length is lower than a switching threshold, which second current wave-shape is formed such that the tip on the electrode is at least partly melted back. Further, the control unit controls the commutation unit in such a way that an operating frequency of the lamp is switched from a first frequency value to a second frequency value, which second frequency value is higher than the first frequency value, if a first time criterion pertaining to a duration of driving of the lamp in the second operation mode is fulfilled and that the operating frequency is switched from the second frequency value to the first frequency value if a second time criterion pertaining to a duration of driving of the lamp in the first operation mode is fulfilled.

An image rendering system, in particular a projection system, according to the invention must comprise a gas-discharge lamp as well as a driving unit according to the invention.

The dependent claims and the subsequent description disclose particularly advantageous embodiments and features of the invention.

There are many ways of determining—directly or indirectly—the current arc-length of the discharge arc. For example, optical (e.g. camera-observations of the projected arc) or spectroscopic (e.g. determination of the arc-length from the line-width of well-known emission lines) measurements can be used to monitor the current arc-length. By proper selection of the appropriate thresholds, any of these measurement techniques will lead to a constant arc-length when used with this invention.

As is known to those skilled in the art, changes in the arc-length will be reflected in changes of the operating voltage. Therefore, in a preferred embodiment of the invention, the operating voltage of the lamp is used as the arc-length control value and the lamp is driven in the first operation mode when the operating voltage of the lamp is higher than a switching threshold voltage value, and the lamp is driven in the second operation mode when the operating voltage is lower than a switching threshold voltage value. Again, in general the two switching threshold voltage values may be different, whereby the switching threshold voltage for the switching-direction from the first current wave-shape to the second current wave-shape has to be lower than the other switching threshold voltage, but also may have the same value.

Most driving units for gas-discharge lamps already comprise a voltage monitoring unit for monitoring the operating voltage of the lamp. Therefore, preferably, such a voltage monitoring unit may be used as the arc-length monitoring unit and the control unit controls the current-forming unit such that the lamp is driven in the first operation mode when the operating voltage is higher than a switching threshold voltage value, and the lamp is driven in the second operation mode when the operating voltage is lower than a switching threshold voltage value.

There are a number of possible time criteria which may be sufficiently used for the monitoring of the frequency changes. In a first embodiment, the first time criterion comprises a first limit pertaining to a time period in which the lamp is—at the time of measurement—continuously driven in the second operation mode. Accordingly, the second time criterion may comprise a second time limit pertaining to a time period in which the lamp is continuously driven in the first operation mode. The first and second time limit may be identical, or may be different time limits.

In a straightforward realization of this embodiment, a simple timer or counter is reset and started upon switching between the first and the second operation mode, i.e. from the first to the second operation mode, or vice versa. The operating frequency is switched between the second frequency value and the first frequency value if a time value measured by the timer, for example, a simple counter reading, is equal to or exceeds a predefined timer value limit.

In a second embodiment, the history of the driving scheme development prior to the very last mode switch is also taken into account. This prevents the lamp from being operated in unfavourable conditions for extended times in the event that the simple timer was reset by a transient mode switch. In this second embodiment, a first total dwell-time, in which the lamp is driven in the first operation mode, and a second total dwell-time, in which the lamp is driven in the second operation mode, are measured. The operation frequency of the lamp is switched from the first frequency value to the second frequency value if the difference between the second total dwell-time and the first total dwell-time is equal to or exceeds a predefined value, and the operation frequency of the lamp is switched from the second frequency value to the first frequency value if the difference between the first total dwell-time and the second total dwell-time is equal to or exceeds a predefined second value. Again, the predefined first value and the predefined second value may be the same value or may be different.

Also, in a relatively easy realization of this second embodiment, a simple counter may be used. In this case, the counter is configured to count in one direction when the lamp is being driven in the first operation mode and to count in the reverse direction when the lamp is being driven in the second operation mode. The value by which the counter is incremented in the different directions may be the same value or may be different. The operating frequency of the lamp is then switched between the first frequency value and the second frequency value in one direction if the counter reading is equal to or exceeds a predefined upper value and in the reverse direction if the counter reading is equal to or less then a predefined lower value. The term 'direction' here is intended to indicate whether the operating frequency is switched 'up' to a higher frequency or 'down' to a lower frequency. The 'direction' of switching can be controlled by a suitable configuration of the counter, as will be known to a person skilled in the art.

As explained above, the first current wave-shape could exhibit an intentional anti-flutter pulse directly preceding a commutation time instant. Therefore, in a preferred embodiment, an intentional peak-pulse current in the first current wave-shape is forced directly preceding a commutation time instant, and in the second current wave-shape the intentional peak-pulse current is shifted away from the commutation time instant, preferably to the first half of an AC-period.

As also explained, the method according to the invention will be of a particular value for the driving of a lamp in an image-rendering system, particularly a projector system. In a method for driving an image rendering system in which the lamp is driven using the method according to the invention, the first and the second current wave-shapes and the first and the second frequency value are preferably synchronized to a display operation mode and/or colour generation cycle, for example, a colour wheel period. This is especially useful if the projector system is a time/colour-sequential micro-display projection engine. In such projectors, the light wave-shape, and therefore the current-amplitude, should be synchronized to the display operation and the colour segment generation. In particular, it should be ensured that the light wave-shape is maintained, even when operation modes or frequencies change.

For this reason, a current-pulse cannot simply be switched off or shifted relative to the colour frame generation cycle. In a preferred embodiment, therefore, the peak-pulse current retains its position in phase (i.e. its position in time relative to the colour frame generation cycle) and the commutation time instant is shifted when a switch-over is made between the first and the second operation mode. Because the light wave-shape only depends on the absolute value of the current-amplitude, the light wave-shape does not change if the commutation time instant is shifted at a switch-over between the different operation modes. In other words, the first current wave-shape and the second current wave-shape only differ in that the commutation time occurs at different instances, whereby the contribution of the current wave-shape to the light-flux is maintained and stays synchronous to the display operation mode and the colour generation cycle.

To facilitate such a synchronisation with the display operation mode and/or the colour generation cycle, the second frequency value is preferably an integer multiple of the first frequency value. The first frequency value may, for example, lie between approximately 30 Hz and 200 Hz, and the second frequency value can therefore lie between approximately 180 Hz and 1500 Hz. More preferably, the first and second frequency values are integer multiples of a colour sequence of the projector system.

In a preferred embodiment of the invention, a contingency threshold which indicates a shorter arc-length than a switching threshold, for example a contingency threshold voltage which is lower than the switching threshold voltage (or the lower switching threshold voltage if two switching thresholds are used), may be defined. The purpose of this contingency threshold is to avoid an excessive decrease in arc-length in the event that the arc-length stabilization mechanism (provided by switching between the first and second operation mode and switching the operation frequency value) temporarily does not function sufficiently well. If the arc-length control value indicates that the arc-length is lower than this contingency threshold, for example, if the operation voltage of the lamp is equal to or less than the contingency threshold voltage, the lamp is driven in a third operation mode in which other measures are taken to prevent continued electrode-tip growth. Such measures include the application of a low-frequency AC-current or a DC-current or a PWM (Pulse Width Modulation) driving scheme. Such a PWM-driving scheme is, e.g., described in U.S. Pat. No. 6,815,907. It has been established in numerous studies that all these operating modes reliably melt electrode-tips and thus increase the arc-length. The actual choice of method and parameters will depend on the lamp design and application.

Preferably, the switching threshold voltages lie in the range between 35 and 140V, depending on the target arc-length and operating pressure of the lamp. More preferably, the switching threshold voltages lie in the range between 45 and 90V. If the switching threshold voltages for the two switching-directions have different values—thus creating a switching-hysteresis—the difference between the two switching threshold voltages preferably lies in the range between 0.1 and 10V; more preferably, the difference lies in the range between 0.5 and 4V. The contingency threshold voltage should then preferably lie 1 to 20V below the switching threshold voltage; more preferably, it lies 4 to 10V below the switching threshold voltage (below the lowest switching threshold voltage if two switching threshold voltages are used).

In a further preferred method, which may be used as an alternative or in addition to the definition of a contingency threshold, the operation mode may be switched from the second operation mode to another operation mode if a third time criterion pertaining to a duration of driving of the lamp in the second operation mode is fulfilled. Accordingly, the operation mode may be switched from the first operation mode to another operation mode if a fourth time criterion pertaining to a duration of driving of the lamp in the first operation mode is fulfilled.

Under certain circumstances, for example after several ten or hundred hours of operation, despite using the arc length stabilisation method explained above, electrode modifications can occur when the first or the second operation mode persist for prolonged times without exceeding the switching threshold at which the operation mode is switched between the first and second operation mode or vice versa. For example, a prolonged driving of the lamp with the first operation mode may sometimes lead to extreme tip-growth. On the other hand, every now and then a prolonged driving in the second operation mode may cause too much electrode burn-back. Such situations may be avoided when further timing conditions are set which prevent an overly or excessively long driving in the first or the second operation mode.

Because an essential point for the behavior of the electrodes is not only the operation mode but also the specific combination of the operation mode and the operation frequency, in a preferred embodiment of the invention, the third time criterion pertains to a duration of driving of the lamp in the second operation mode with the second operation frequency and/or the fourth time criterion pertains to a duration of driving of the lamp in the first operation mode with the first operation frequency.

Preferably, the operation mode may be switched from the second operation mode to a special first contingency mode which causes a marked electrode burn-back, if the third time criterion is fulfilled. Also, the operation mode may be switched from the first operation mode to a special second contingency mode that results in a sufficient electrode growth, if the fourth time criterion is fulfilled.

In most embodiments, the first and the second contingency mode will be different, although it may also be possible that the same operation mode is applied to undo both types of extreme electrode modifications.

A multitude of contingency modes that can be used for the desired purpose are well known and have been described. Some examples include the proper choice of frequency, pulse-height, or current-wave shape to achieve the momentary goal such as removal of tips or growth of tips, respectively. For example, the first contingency mode may be selected from the third operation modes already mentioned above, and as a possible embodiment of the second contingency mode, for example, the pulse-height for tip growth could simply be stepped up.

In a simple further preferred embodiment, instead of switching into a special contingency mode, the driver may be switched from the second operation mode to the first operation mode if the third time criterion is fulfilled and/or the driver may be switched from the first operation mode to the second operation mode if the fourth time criterion is fulfilled, i.e. the driver is forced simply to change the operation mode by a timing condition if the 'normal' arc-length stabilization process in which the threshold value is used as a switching criterion does not lead to a change of the operation mode for a prolonged time. In this case the first and second operation modes themselves serve as 'contingency modes'.

As explained above for the first and second time criterion, the third and the fourth time criterion may comprise a third limit pertaining to a time period in which the lamp is—at the time of measurement—continuously driven in the second operation mode, if necessary with the second operation frequency, and the fourth time criterion may comprise a fourth time limit pertaining to a time period in which the lamp is continuously driven in the first operation mode, if necessary with the first operation frequency. The third and fourth time limit may be identical, or may be different time limits. Accordingly, a simple timer or counter may be used to control the third and fourth time limit in a similar manner as for the first and second time limit.

By using a simple time criterion instead of a contingency threshold, the start of the contingency driving mode, which should work when the 'normal' stabilization method using the switching threshold temporarily fails to function, is independent of pre-selected thresholds and is thus, e.g., insensitive to production spreads. If the time preceding the mode change is sufficiently short (e.g. below 60 min), no significant electrode modifications will occur.

The contingency modes can be employed continually until the 'normal' arc-length stabilization method or possibly another arc-length stabilization method determines otherwise. Alternatively, the contingency modes can be employed only for a limited duration, e.g. for a duration between 0.1 s and 60 min. If applied only for very short times (<1 s), the contingency mode can be regarded as a brief distortion of the standard operation mode. Such a brief application is proposed in particular when a special contingency mode is used that introduces a sufficiently strong perturbation, e.g. by very large pulses to prevent the continued tip-growth or burn-back.

In many cases it will make the most sense to use the contingency modes for durations that are comparable to the third or fourth time condition so that sufficient time is gained to undo previous—potentially detrimental—electrode modifications. After expiration of this duration, the contingency mode should then switch back to the previous operation mode. If the first and second operation modes themselves serve as 'contingency modes', as described above, a switching back to the previous mode may simply be triggered by the 'normal' arc-length stabilization method, i.e. should the threshold value be exceeded the next time, or should the next time criterion be fulfilled.

The invention can be applied to various kinds of gas-discharge lamps. In particular, the invention is suited for high pressure gas-discharge lamps, especially for UHP (Ultra High Performance) and/or for HID (High Intensity Discharge) lamps. As has been described above, the invention offers significant advantages if it is used for gas-discharge lamps within image rendering systems. Nevertheless, the invention is not limited to these applications. For example, the invention could also be applied advantageously for gas-discharge lamps which are used in motor vehicles, like gas-discharge lamps for automotive head-lights, or for gas-discharge lamps employed in stage and architectural spotlights.

Other objects and features of the present invention will become apparent from the following detailed descriptions considered in conjunction with the accompanying drawings. It is to be understood, however, that the drawings are designed solely for the purposes of illustration and not as a definition of the limits of the invention.

The dimensions of the objects in the figures have been chosen for the sake of clarity and do not necessarily reflect the actual relative dimensions. Objects in the diagrams are not necessarily drawn to scale.

DETAILED DESCRIPTION OF EMBODIMENTS

Figure 1:
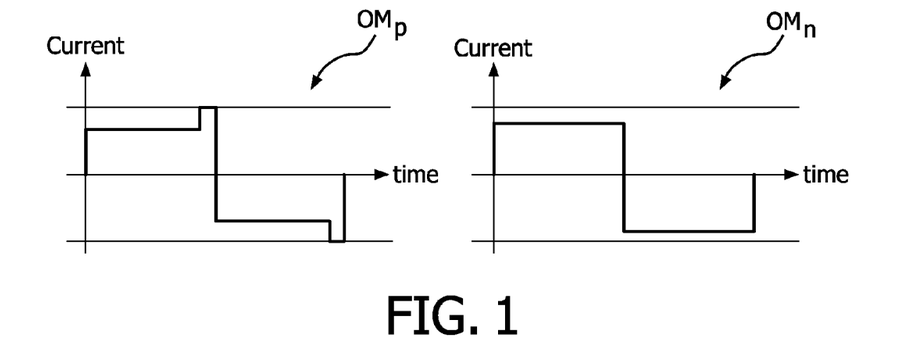
FIG. 1 shows a possible schematic waveform of the alternating current being applied to the gas-discharge lamp during the first and the second operation mode according to the invention.

As explained above, the invention employs the following basic principle:

It is a well-established observation that different current wave-shapes lead to different temporal developments of the structures on the front faces of UHP electrodes. In particular, an operation mode with an intentional pulse superimposed on the "standard" block current wave-shape directly preceding a commutation time instant, which can be seen on the left side of FIG. 1, results in the growth of small tips on the electrodes' front faces. This operation mode, often called "pulsed operation", is herein referred to as the "first" operation mode $OM_p$. On the other hand, standard square-wave operation (as shown on the right in FIG. 1) will result in these small tips being melted away. This standard "non-pulsed operation" is herein referred to as the "second" operation mode $OM_n$. The effect on the small electrode tips is independent of the operating frequency of the lamp over a wide range of typical operating frequencies.

The presence of tip structures alters the length of the discharge arc, and therefore also the level of the operating voltage of the lamp. This means that the growing and melting of these tips can be directly observed in the development of the lamp voltage over time. As explained above, any other means (instead of measurements of the lamp voltage) can be used to determine the current arc-length. However, as the monitoring of the lamp voltage may be realised in a simple way in the lamp driver without additional measuring equipment at the lamp, it is assumed in the following that this method is used to (indirectly) monitor the arc-length.

Figure 2:
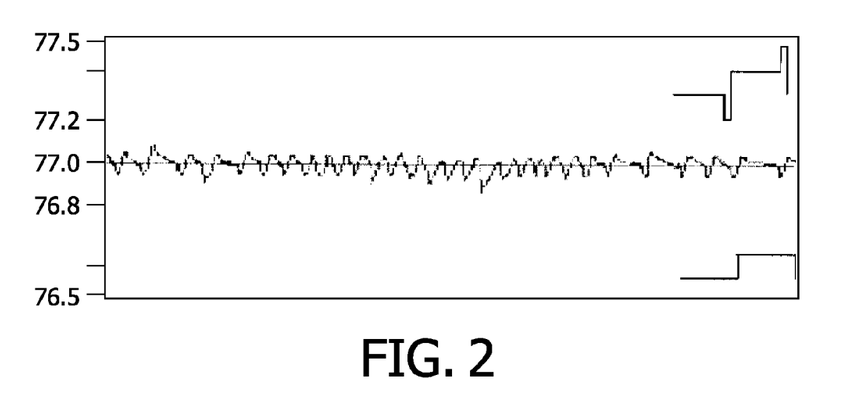
FIG. 2 shows a diagram of an operating voltage of a UHP-lamp operated at 60 Hz operation frequency, whereby the operating voltage is stabilized by switching between the first and the second operation mode.

In FIG. 2, a screenshot of an oscilloscope measuring the operating voltage of a standard UHP lamp is shown. In operating this lamp, the following scheme was applied: above a certain switching voltage level or switching threshold voltage $V_{T1}$ (in this case 77V), the lamp was operated in the first operation mode $OM_p$, whereas below this switching threshold voltage $V_{T1}$, the lamp was operated in the second operation mode $OM_n$, i.e. the pulse was switched off. This scheme led to a frequent growing and melting of small tips. The resulting small variations in the lamp voltage can be seen in the plot. However, since the mode-switch from the first operation mode $OM_p$ to the second operation mode $OM_n$, and vice versa was performed very rapidly, at most with 250 ms delay after traversing the switching threshold voltage $V_{T1}$, no large-scale structures were created or destroyed. Thus, the overall structure of and distance between the electrodes was preserved, leading to a very stable operating voltage. In FIG. 2, the timescale corresponds to about 150 s. In this example, the lamp was operated at 60 Hz. The insets symbolize the current wave-shape used at both sides of the switching threshold voltage $V_{T1}$.

Figure 3:
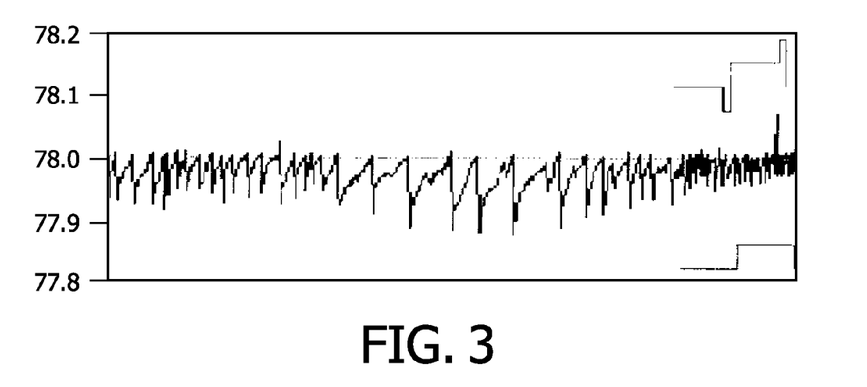
FIG. 3 shows a diagram of an operating voltage of a UHP-lamp operated at 360 Hz operation frequency, whereby the operating voltage is stabilized by switching between the first and the second operation mode.

This effect of stabilization of the operating voltage by switching of the current wave-shape can be obtained at other operating frequencies as well. As an example, FIG. 3 shows an oscilloscope screenshot of a measurement of the operating voltage for a frequency of 360 Hz. Here, the displayed voltage range is even smaller than that shown in FIG. 2.

For beneficial use of this effect, however, another aspect must also be considered, namely the short-term stability of the discharge arc. It is a well-known issue for UHP-like lamps that under certain circumstances, the position of the discharge arc between the electrodes may vary over time. This effect is known as "arc flicker". Especially when these variations occur on short timescales, they may be noticeable to the user.

Figure 4:
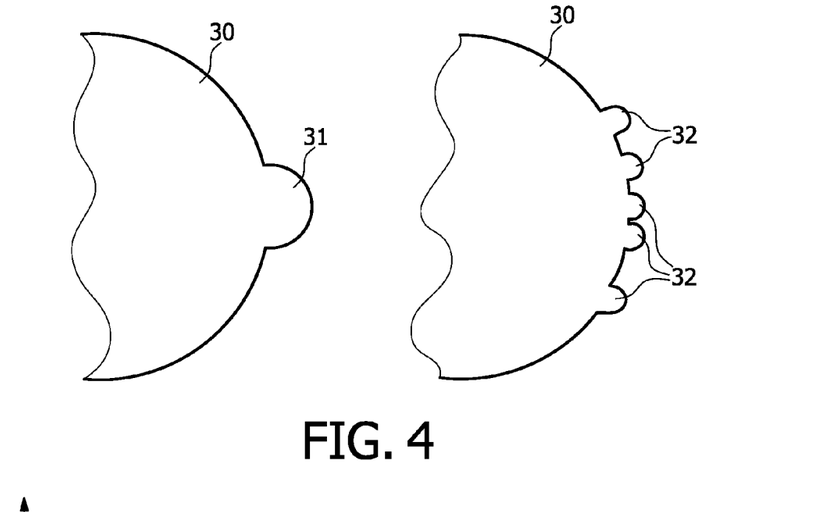
FIG. 4 schematically shows tip-formations at the front face of an electrode in a pulsed operation-mode at different operating frequencies (left: low frequency; right: high frequency)

As mentioned above, when using the first operation mode $OM_p$, a tip grows on the electrode front-face due to the current-pulse, and this tip fixes the position of the discharge arc and thus prohibits arc flicker. However, the tip-pattern actually developing or growing at any one time depends largely on the frequency at which the lamp is operating. At low frequencies, only one relatively large tip or a small number of such tips grows, whereas at higher frequencies, the number of tips increases, while the diameters of these tips decrease. This is shown schematically in FIG. 4, in which the left-hand side shows a possible formation of a tip 31 at the front face of an electrode 30 in a pulsed operation-mode at a low operation frequency (e.g. 60 Hz) and the right-hand side shows a possible tip formation, with several tips 32, at the electrode front face in a pulsed operation mode at a high operation frequency (e.g. 360 Hz). Thus, for high-frequency pulse operation, arc flicker cannot be fully excluded, since the numerous tips 32 growing at the high operating frequency offer a variety of arc attachment points between which the arc may move.

On the other hand, in the second operation mode $OM_n$ without a current-pulse directly preceding a current-commutation time instant—when no electrode-tips are growing—the probability of arc flicker decreases with increasing operating frequency. This results from the fact that at higher operating frequencies, the electrodes do not cool down so much during the cathode phase as they do at lower operating frequencies.

For both operation modes discussed above, when the lamp operates in an unfavourable operation mode/frequency combination, the onset of arc flicker occurs after a time delay. This is because, for example, in the case of using the first (pulsed) operation mode $OM_p$ at a high frequency, the multiple electrode tips must first develop or grow, which takes time, before arc flicker can occur. The time delay depends on several factors and lies between tens of seconds to several tens of minutes. With respect to arc flicker it is therefore safe to operate the lamp for a limited time in unfavourable mode/frequency combinations; once this limited time has elapsed, however, either operation mode or operating frequency must be changed to ensure flicker-free lamp operation.

Therefore, in the driving method according to the invention, the switching of the operation mode is combined with a delayed, conditional switching of the operating frequency.

The switching of the operation mode takes place every time the lamp voltage crosses a particular switching threshold voltage $V_{T1}$. Above this switching threshold voltage $V_{T1}$, the lamp is driven in a first operation mode $OM_p$ to induce tip-growth. The lamp is driven in a second operation mode $OM_n$ below the switching threshold voltage $V_{T1}$ to inhibit further tip-growth and to at least partly melt away the established tips.

In a first embodiment of the invention, every time the operation mode is changed, an associated timer is reset to zero and started. If this timer exceeds a certain predefined limit, the operating frequency of the lamp is also changed to such a value of frequency at which, with that particular operation mode, no arc flicker occurs. Above the switching threshold voltage $V_{T1}$ when the lamp is driven with the second (higher) frequency value $f_2$ in the first (pulsed) operation mode $OM_p$, the operation frequency is switched to a first (lower) frequency value $f_1$. Below the switching threshold voltage $V_{T1}$, if the lamp is driven with the first (lower) frequency value $f_1$ in the second (non-pulsed) operation mode $OM_n$, the operation frequency is switched to the second (higher) frequency value $f_2$. If the lamp is already driven with the first frequency value $f_1$ in the first operation mode $OM_p$ or with the second frequency value $f_2$ in the second operation mode $OM_n$, no operation frequency switch will occur. Thus, the timer essentially measures and limits the dwell-time of the lamp in certain unfavourable operation mode/frequency combinations.

Figure 5:
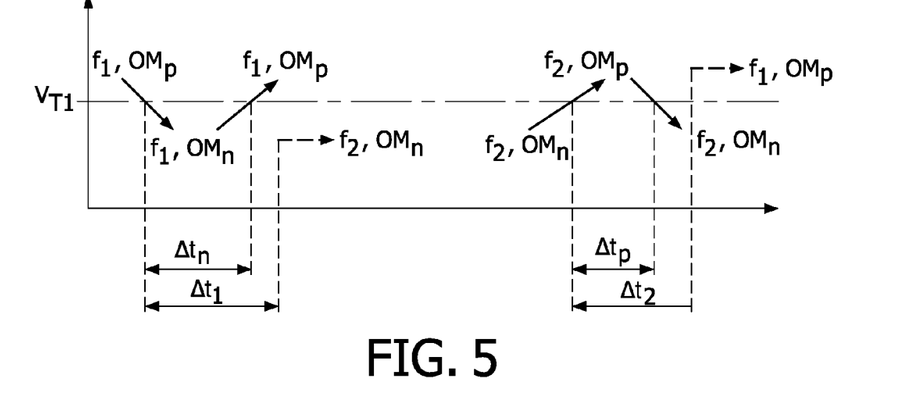
FIG. 5 illustrates the possible temporal development of the lamp voltage together with the associated mode/frequency combinations used to operate the lamp according to one embodiment of the invention.

FIG. 5 shows a driving scheme that embodies the essential features of the invention. The switching threshold voltage $V_{T1}$ separates the two regions where different operation modes are employed—the first operation mode $OM_p$ above the switching threshold voltage $V_{T1}$, and the second operation mode $OM_n$ below the switching threshold voltage $V_{T1}$. When the lamp voltage crosses this switching threshold voltage $V_{T1}$, indicated in FIG. 5 by the solid-line arrows, the timer is restarted and the operation mode is changed, while the operating frequency stays the same. However, under certain circumstances, indicated in FIG. 5 by the dashed arrows, it may happen that the re-crossing of the switching threshold voltage takes too long and the time between mode switches $\Delta t_n$, $\Delta t_p$ exceeds a predefined delay time or time limit $\Delta t_1$, $\Delta t_2$. Only in these rare cases, the operating frequency is also changed, to operate the lamp in a flicker-avoiding operation mode/frequency combination. Generally, the two time limits $\Delta t_1$, $\Delta t_2$ for the transition $f_1 \rightarrow f_2$, (for the operation time $\Delta t_n$ in the second operation mode $OM_n$) and for the transition $f_2 \rightarrow f_1$ (for the operation time $\Delta t_p$ in the first operation mode $OM_p$) can be different, as shown in FIG. 5. In a simple implementation, the time limits $\Delta t_1$, $\Delta t_2$ could also be identical. Preferably, the time limits lie in the range between 1 s and 60 minutes; more preferably, they lie between 10 s and 300 s. The ratio of the two time limits $\Delta t_1$, $\Delta t_2$ preferably lies in the range between 0.01 and 100; more preferably, it lies between 0.2 and 5.

Using such a driving scheme, the lamp voltage can be stabilized, while avoiding arc flicker. In most cases, the change of the operation mode itself will have the desired effect, because of the re-crossing of the switching threshold voltage $V_{T1}$ after a short time, which in turn leads to another change in the operation mode, thus inhibiting excessive and/or long-lasting alterations to the electrode front face. These threshold-crossings are linked to a reset of the associated timer. Thus, if the predefined timer-limits are sufficiently large, changes in the operating frequency and the resulting disadvantages, mentioned above, can be avoided in most cases. In addition, due to the fact that significant alterations to the electrode front faces are prevented, the overall arc stability—both axial and lateral—improves.

Figure 6:
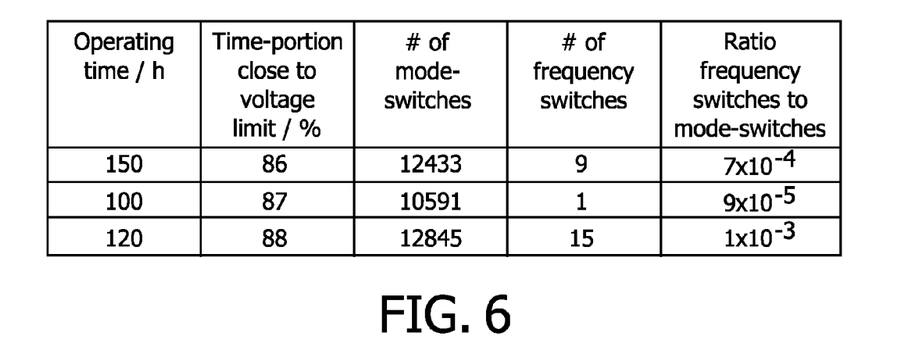
FIG. 6 shows a table with experimental results showing the number of operation mode switches and frequency switches during the operation time of a lamp.

In a first experiment, in which a lamp was operated close to (±1V) the chosen switching threshold voltage in 90% of over 46 h run-time, 2510 operation mode switches occurred, while not a single change in the operating frequency was initiated. Further experimental results are shown in the table in FIG. 6. As can be seen, operating-frequency changes seldom occurred.

In another embodiment of the invention, a resetting of the timer or counter used for measuring the time that the lamp is operated in a certain operation mode is omitted. Instead, a certain increment is added to the actual counter value after fixed time intervals, e.g. every second. For the two possible operating modes, the first operation mode and the second operation mode, the increments have opposite signs (plus or minus). Thus, the counter is increased while in one of the operating modes and decreased while in the other mode. The operating frequency will then be changed when the counter reaches a certain predefined lower limit while decreasing, or when it reaches an upper limit while increasing. In such an embodiment, the counter also records the history of the driving-scheme development prior to the very last mode switch. This prevents the lamp being operated in unfavourable conditions for extended times in the event of a transient mode switch (which would reset the counter in the previous embodiment). If the memory is non-volatile, even the operation mode history prior to previous switch-offs of the lamp can be considered in determining the time that the lamp dwells in unfavourable operating conditions.

Different time limits for the frequency transitions can be realised by using different absolute values for the two increments. Furthermore, the counter limits at which the frequency is switched do not have to be the physical upper and lower limits of the counter memory. By judicious choice of these limits, additional fixed delays that are different for the different operation modes can be introduced. Furthermore, an unlimited increase of the delays can be prevented when, for example, physical memory limits are reached.

By proper choice of the increments and the size of the counter memory, the length of operation mode history that can be taken into account can be determined. In many cases, even a cheap 8-bit memory will be sufficient for this accumulating timer. The counter limits for an 8-bit counter preferably lie in the range between 0 to 100 for the lower limit and 150 to 255 for the upper limit. Other counter-sizes will lead to different, but equivalent limits. Preferably, the absolute rates of the two increments lie in the range between 0.01 s$^{-1}$ and 100 s$^{-1}$. The ratio of the two increments preferably lies in the range between −100 and −0.01; more preferably, it lies between −5 and −0.2.

The invention can most favourably be used together with time/colour-sequential micro-display projection engines, like typical DLP projection engines. In such projectors, the light wave-shape, which is a result of the current amplitude, is synchronized to the display operation and has to stay the same, even when the switching threshold voltage is crossed. Therefore, the current-pulse cannot simply be switched off, as in the example of FIG. 1.

However, a similar effect can be achieved by moving the peak current pulse, used as an anti-flutter pulse in the first operation mode, to a different relative position in the current wave-shape. Therefore, in this embodiment, the peak current pulse stays fixed in time independently of the operation mode, while the commutation of the lamp current is moved to a different instance in time. Such a driving scheme would have no effect on the light flux, i.e. it provides a constant flux pattern in the application, while stabilizing the lamp voltage.

Figure 7A:
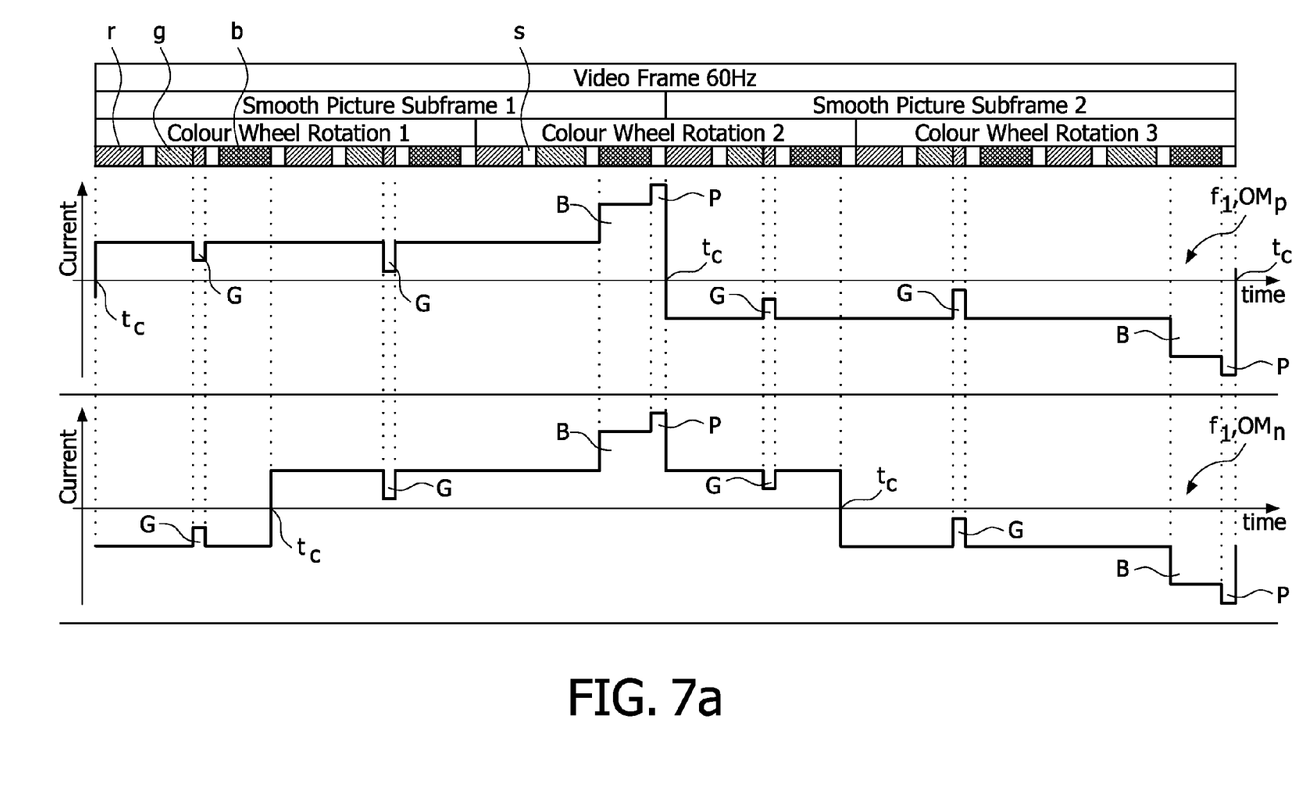
FIGS. 7a and 7b show a possible driving scheme for the different combinations of the first and the second operation mode and the first and the second frequency values.
Figure 7B:
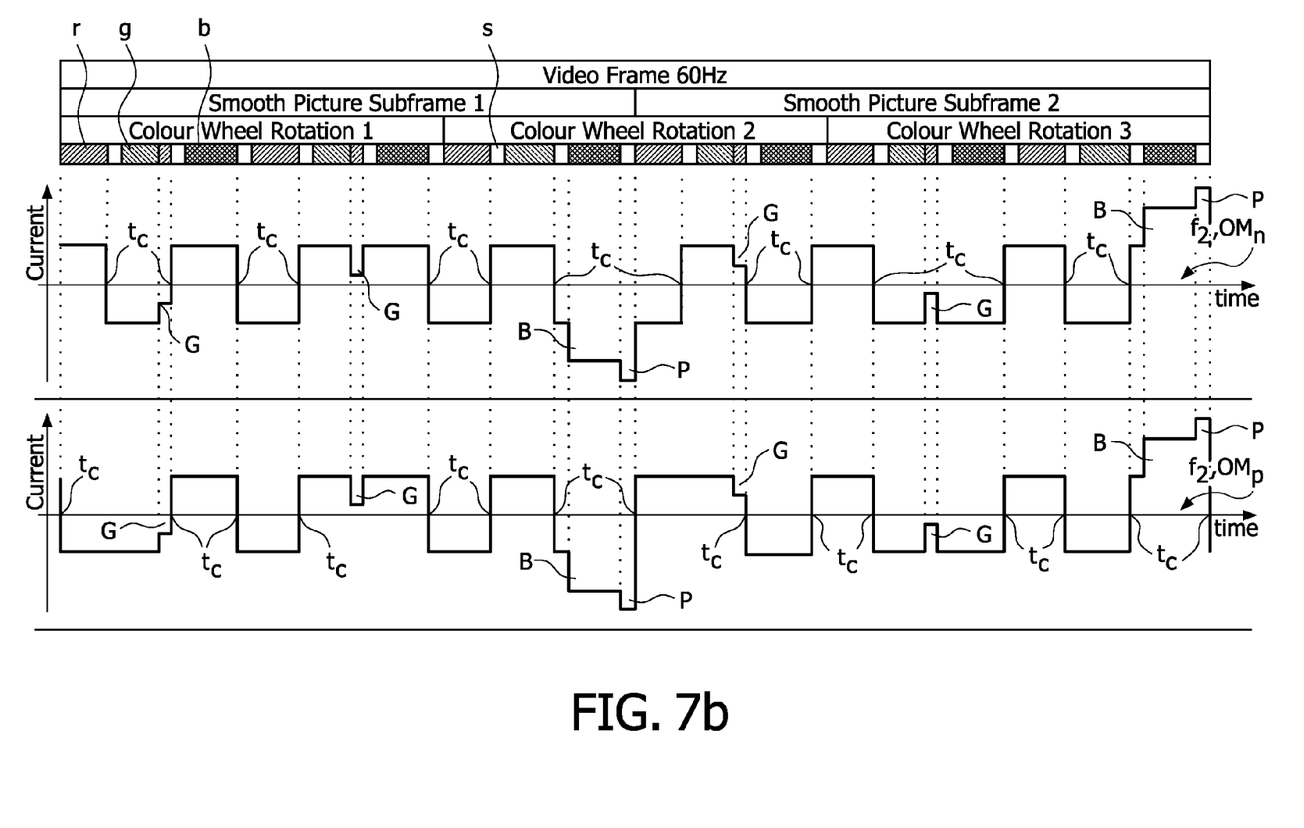

FIGS. 7a and 7b show an example of such a driving scheme. The system shown here is a DLP® (Digital Light Processing) mirror device optimised for video projection. It applies a 6-segment colour wheel rotating three times during each video frame. A colour segment cycle with the three colour segments red r, green g and blue b and with "spoke-times" s between the colour segments r, g, b, and their relative position to the current wave-shape, which is synchronized with the colour wheel, is shown at the top of FIGS. 7a and 7b. In this example, the display resolution is doubled by 'Smooth Picture' wobulation (overlapping pixels in a specific manner).

In addition to realizing the arc-stabilizing effect described in this invention, further advantages are achieved by the current wave-shape shown in FIGS. 7a and 7b. An adequate colour balance is obtained by using lamp current pulses with fixed relative levels in different colour segments. For example, in FIGS. 7a and 7b, the colour balance is shifted towards the blue by using a higher current amplitude B in one of the blue segments b. Negative lamp current pulses G are used to increase the greyscale resolution in green. For a further discussion of these colour-related advantages, see e.g. Moench et al., SID Symposium Digest 37, 1720-1723, or WO 95/11572. Here, this current wave shape is selected to illustrate the applicability of the invention also to more complex driving-situations than simple block currents. FIGS. 7a and 7b show the schematic current wave-shape, without possible distortions like overshoot and ringing that may occur in the practical implementation.

In the first operation mode $OM_p$, shown in the upper current-diagram of FIG. 7a, the commutation time instant $t_C$ is positioned directly after the peak pulse-current P (the anti-flutter pulse), which leads to tip-growth. The additional peaking P is positioned in a spoke time of the colour wheel. This operation mode is used if the operation voltage is above the switching threshold voltage $V_{T1}$ of, for example, 60 V. In this upper current diagram of FIG. 7a, the operation frequency value $f_1$ is 60 Hz.

When the operation voltage crosses the switching threshold voltage $V_{T1}$, the wave-shape amplitude corresponding to the absolute value of the lamp current remains constant, while the commutation time instant $t_C$ is moved. This second operation mode $OM_n$, is shown in the lower current-diagram of FIG. 7a. In both operation modes the commutation time instants $t_C$ are preferably always placed during a spoke time s. The design of these commutation time instants $t_C$ in the second operation mode $OM_n$ is done such that the current-pulse P becomes ineffective for tip-growth, i.e. the current pulse is located far away from the current commutation time instant. In this way, tip-growth is interrupted.

If the timer indicates an excessively long operation in this mode, the frequency must be changed. Again, the amplitude wave-shape has to remain unchanged, while additional commutation time instants $t_C$ are placed in additional spokes s. In other words, the operation frequency is shifted to a higher frequency value $f_2$, shown in the upper current diagram of FIG. 7b. In this example, the higher frequency value $f_2$ is 420 Hz which is seven times the lower frequency value $f_1$.

In this example, when the voltage rises above the switching threshold voltage $V_{T1}$, tip-growth is enabled by again changing the commutation timing, i.e. by switching back into the first operation mode $OM_p$, but with a higher operation frequency. Now the pulse P is again located just before a commutation time instant $t_C$. This is shown in the lower current-diagram of FIG. 7b. It can be seen that it is not necessary to have an anti-flutter pulse P preceding each commutation time instant $t_C$, but, for achieving the tip-growing effect, it suffices to have such a pulse P, for example, preceding every seventh commutation time instant $t_C$.

Later on, if the timer indicates again that a time limit is reached, the frequency can be changed back to the favourable lower frequency value $f_1$. This operating mode can be seen again in the upper current-diagram of FIG. 7a.

Preferably, when the lamp is switched on, the driving scheme commences with the first operation mode $OM_p$ and the lower frequency value $f_1$. Depending on the type of counter implemented, it may be useful to re-start the counter after switch-on with a value that is not zero, but equal to a predefined value, in order to influence the time interval the lamp is operated in the start-up driving scheme before the first frequency switch takes place.

As already mentioned, it is preferable to have a contingency threshold voltage as a kind of failure protection. The purpose of this contingency threshold is to avoid an excessive decrease of the arc-length in the event that the arc length stabilization mechanism described above temporarily fails to work well enough in melting a tip on the electrode. If the operation voltage falls below this contingency threshold voltage, a third operation mode will be activated. In the example above, this contingency threshold voltage could be 54 V.

Figure 8:
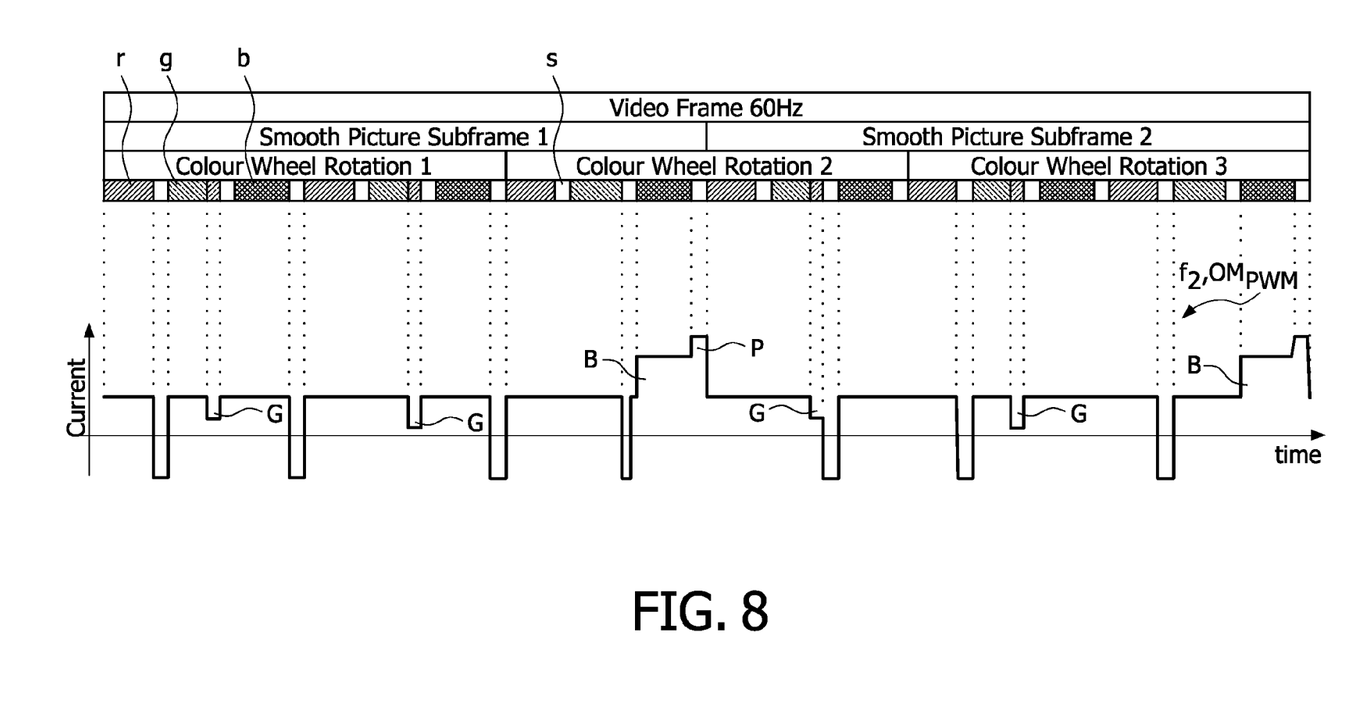
FIG. 8 shows a possible driving scheme for a third operation mode.

It is known that the thermal load during the anode phase of an electrode is higher than during the cathode phase. Therefore, tips on the electrode front-face can be melted away relatively fast by introducing a long phase with only one effective current direction. As the lamp drivers for most UHP lamps are generally not designed to generate low frequencies, because the commutations are used to generate internal supply voltages for the switches, and for DLP® also the light wave-shape has to remain unchanged, a solution for this third operation mode $OM_{PWM}$ might appear as shown in FIG. 8. Here, the lamp is driven in a kind of pseudo-DC-mode in which the current is mainly applied to the lamp in one direction and only switched in the other direction for very short periods. This PWM (Pulse Width Modulation) generated wave-shape will effectively melt back the tips on the one of the electrodes that operates mainly as anode. To be effective for tips on both electrodes, the pseudo-DC-mode as shown in FIG. 8 must of course be applied to both electrodes, e.g. by reversing the displayed current wave-shape. In the example shown in FIG. 8, the operation frequency is still 420 Hz and the light wave-shape is still the same as in the driving scheme example of FIG. 7 (with the higher current amplitude B in the blue segment b and the lower current phases G in the green segments g). This third operation mode normally needs to be applied for only about 0.03 s to 3 s, until the tips on both electrodes are sufficiently melted back and the operation voltage returns to values above the contingency threshold voltage.

Figure 9:
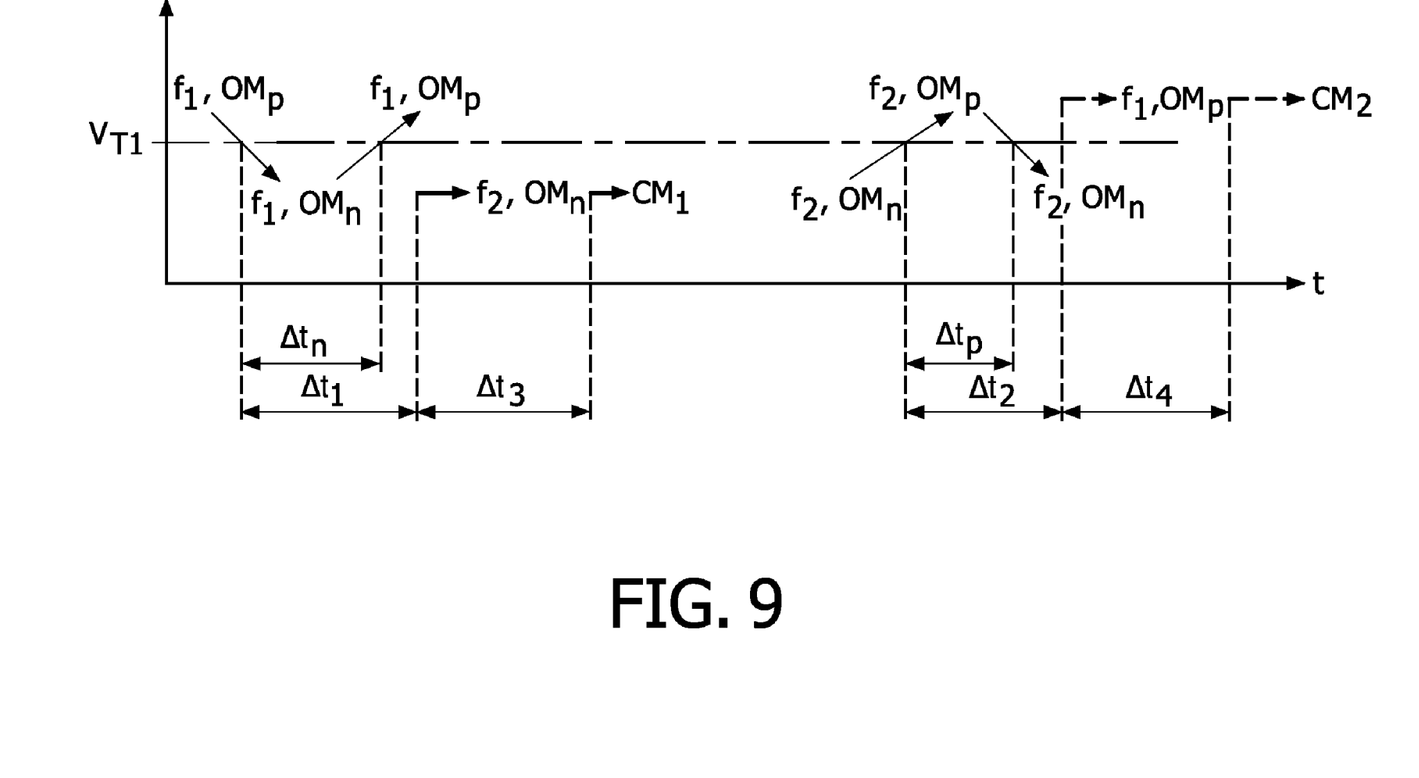
FIG. 9 illustrates the possible temporal development of the lamp voltage together with the associated mode/frequency combinations used to operate the lamp according to a further embodiment of the invention.

FIG. 9 shows an enhanced driving scheme similar to the driving scheme shown in FIG. 5. In this enhanced driving scheme additional delay times or time limit $\Delta t_3$, $\Delta t_4$ are introduced. A third time limit $\Delta t_3$ starts at the end of the first time limit $\Delta t_1$ and concerns the duration in which the lamp is driven in the second (non-pulsed) operation mode $OM_n$ with the second (higher) operation frequency $f_1$. Accordingly the fourth time limit $\Delta t_4$ starts at the end of the second time limit $\Delta t_2$ and concerns the duration in which the lamp is driven in the first (pulsed) operation mode $OM_p$ with the first (lower) operation frequency $f_1$. The corresponding timers are only started when the lamp operates in the specific operation mode/operation frequency combinations $OM_n,f_2$ and $OM_p,f_1$.

If the lamp is operated in the second operation mode $OM_n$ with the second operation frequency $f_2$ and the timer will exceed the predefined third time limit $\Delta t_3$, the operation mode is switched to a particular first contingency mode $CM_1$; if the lamp is operated in the first operation mode $OM_p$ with the first operation frequency $f_1$ and the timer will exceed the predefined fourth time limit $\Delta t_4$, the operation mode is switched to a particular second contingency mode $CM_2$. The purpose of these contingency modes $CM_1$, $CM_2$ is then to undo or reverse the detrimental effects of the previous operation mode. Examples for possible contingency modes $CM_1$, $CM_2$ are already explained above. One possible first contingency mode $CM_1$ may be the third operation mode $OM_{PWM}$ described in connection with FIG. 8.

The third and fourth time limits $\Delta t_3$, $\Delta t_4$ could be different but may also be identical. Preferably, the time limits lie $\Delta t_3$, $\Delta t_4$ in the range between 1 s and 60 minutes; more preferably between 10 s and 300 s.

As already explained above, the contingency modes $CM_1$, $CM_2$ can be applied for a limited duration which, for example, is comparable to the third and fourth time limits $\Delta t_3$, $\Delta t_4$. The operation mode may then switch back to the previous operation mode. However, the switching schedule given by the switching threshold voltage $V_{T1}$ should prevail over any predefined durations for the contingency mode; when the switching threshold voltage $V_{T1}$ is reached, the 'normal' arc-length stabilization method according to the invention determines which operation mode $OM_n$, $OM_p$ should subsequently be used.

In a very simple embodiment, the first operation mode $OM_p$ is used as the first contingency mode $CM_1$ and the second operation mode $OM_n$, is used as the second contingency mode $CM_2$, i.e. if the lamp is driven in one of the operation modes $OM_n$, $OM_p$ over a prolonged time without reaching the switching threshold voltage $V_{T1}$, a switch to the other operation mode $OM_p$, $OM_n$, is triggered by the timing condition.

If desired in the application, the conditional timer-controlled change in operation mode may be introduced only for the first operation mode $OM_p$, applied above the switching threshold voltage $V_{T1}$, thus preventing burn-back, but not preventing tip-growth. In the same way, the conditional timer-controlled operation mode change can be introduced only for the second operation mode $OM_n$, applied below the switching threshold voltage $V_{T1}$, thus preventing tip-growth, but not burn-back. However, in most embodiments, it will be most beneficial if such a contingency timer-controlled operation mode change is applied to both types of extreme electrode modifications.

Further, in the enhanced driving scheme, a contingency threshold voltage $V_{T2}$ as described above may be abandoned, although it may be possible to use such an additional contingency threshold voltage as a further fall-back in protection against failure.

Figure 10:
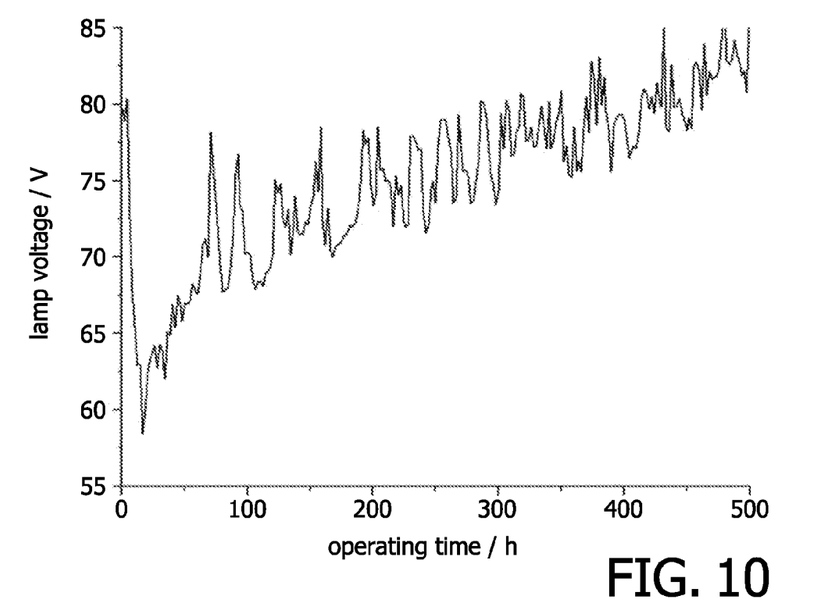
FIG. 10 shows a graph of the operating voltage of a UHP lamp over time, which lamp is operated using a conventional operation mode.
Figure 11:
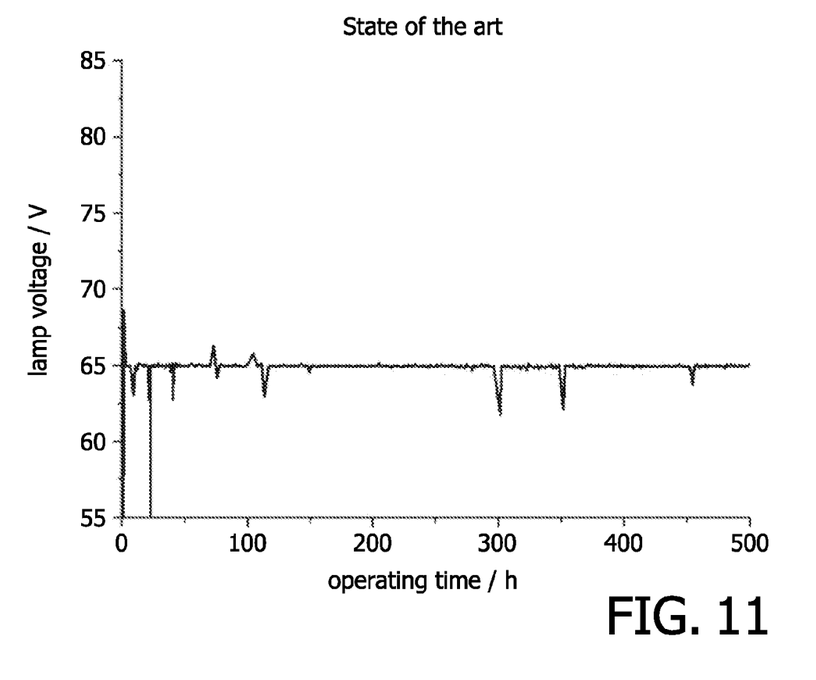
FIG. 11 shows a graph of the operating voltage of a UHP-lamp over time, which lamp is operated using an optimised operation mode according to the invention.

The following two FIGS. 10 and 11 demonstrate the beneficial effects of the invention. FIG. 10 shows the lamp voltage of an ultra-short-arc UHP lamp that was operated at 120 W as function of operating time without any special arc-length stabilization method as it is known from the state of the art. In contrast, for the experiment for which the results are shown in FIG. 11 (also showing lamp voltage as function of operating time) an arc-length stabilization method according to the invention was applied to an ultra-short-arc UHP lamp operated at 132 W to fix the arc-length at about 0.6 mm. Since the lamp voltage depends linearly on arc-length, the diagram shows that, overall, the arc-length stabilization method worked well. To reduce the complexity of the driving scheme in this demonstration, all delay times were set to the same value, and the contingency modes $CM_1$, $CM_2$ were selected from the same set of operation modes $OM_p$, $OM_n$ that were used for the arc-length stabilization method. Clearly, the new driving scheme according to this invention significantly reduces the voltage variations and thus the arc-length variations.

Figure 12:
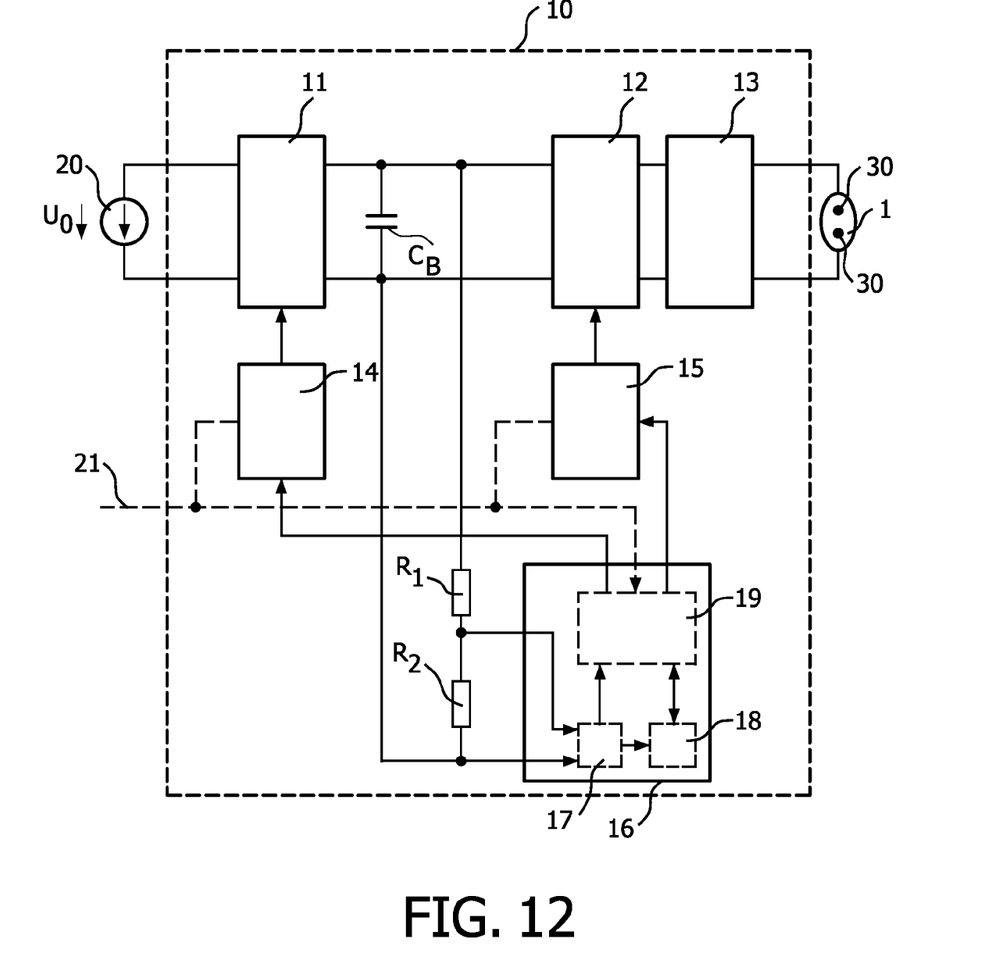
FIG. 12 shows a gas-discharge lamp and a block diagram of a possible realisation of a driving unit according to the invention.

FIG. 12 shows a gas-discharge lamp 1 and a block diagram of a possible realisation of a driving unit 10 according to the invention, which may be used in a projector system.

The circuit shown in FIG. 12 comprises a power source 20 with which supply voltage $U_0$ of, for example, 380 Volt DC is made available to a down converter unit 11. The output of the down converter unit 11 is connected via a buffer capacitor $C_B$ to a commutation unit 12, which in turn supplies an ignition stage 13 by means of which the lamp 1 is ignited and operated.

The voltage applied to the buffer capacitor $C_B$ is additionally fed via a voltage divider $R_1$, $R_2$ to a voltage monitoring unit 17. Here the voltage monitoring unit 17 is part of control unit 16. Alternatively, the voltage monitoring unit 17 may be realized as a separate component which is connected to the control unit 16. The voltage monitoring unit 17 monitors the operation voltage with regard to whether—as already described—the operation voltage is above or below the predetermined switching threshold or contingency threshold voltages.

A further component of the control unit 16, which may also be realised as a separate component, is a timer 18. This timer 18 receives an appropriate signal from the voltage monitoring unit 17 to indicate the region in which the operation voltage actually lies. The time duration is accumulated or counted in the timer 18. An operation mode decision unit 19 decides, in the manner described above, in which operation mode and at what frequency the lamp 1 is to be driven, depending on the indication of the region in which the operation voltage actually lies and depending on the time duration accumulated by the timer 18. For even more control over the lamp operation it may be useful also to have a feedback between the operation mode decision unit 19 and the timer 18. Such feedback would e.g. allow to set the timer to specific pre-selected values, e.g. during the switch-on phase.

A resulting signal is forwarded from the operation mode decision unit 19 to a frequency generator 15, which drives the commutation unit 12 at the appropriate frequency, and an additional signal is forwarded to a wave forming unit 14, which, using the down converter 11, ensures that the correct current-pulse wave-shape is generated for the desired operation mode. The control unit 16, the frequency generator 15 and the wave forming unit 14 receive a synchronisation signal via an input 21 of the driving unit 10, for synchronising the lamp driver with a display unit or the colour generation unit of the projection system.

If a timer or counter is chosen with the ability to count and store different values in parallel the timer may be also used to control the third and fourth time limit as described above. A simple timer storing only one counting value may be used if the timer is always started again for all timing criteria.

At this point it will be noted that, in particular the control unit 16 or at least parts of the control unit 16 such as the operation mode decision unit 19, can be realised as appropriate software that can run on a processor of the driving unit 10. In particular, this allows existing units to be upgraded to be operated using the method according to the invention, provided that the driving unit permits the required controlling of the wave forming unit and the frequency generator. The driving unit 10 is preferably also equipped with a suitable interface, so that the various time limits and threshold voltages can be configured at time of manufacture or at a later time, for example when a different lamp type is to be used.

The invention can preferably be used with all types of short-arc HID-lamps that can be driven with the complex driving scheme described above. The use of this driving scheme is particularly advantageous in conjunction with ultra-short-arc UHP-lamps, where a stable arc (both axial and lateral) is of utmost importance for a constant light-flux in the application.

Although the present invention has been disclosed in the form of preferred embodiments and variations thereon, it will be understood that numerous additional modifications and variations could be made thereto without departing from the scope of the invention. For the sake of clarity, it is also to be understood that the use of "a" or "an" throughout this application does not exclude a plurality, and "comprising" does not exclude other steps or elements. Also, a "unit" may comprise a number of blocks or devices, unless explicitly described as a single entity.

The invention claimed is:

1. A method of driving a gas-discharge lamp with an alternating current, the method comprising monitoring an arc-length control value, indicating the current length of a discharge arc of the gas-discharge lamp, driving the lamp in a first operation mode ($OM_p$) with a first current wave-shape when the arc-length control value indicates that the arc-length is higher than a switching threshold, which first current wave-shape is selected to result in a tip growing on an electrode of the lamp, driving the lamp in a second operation mode ($OM_n$) with a second current wave-shape when the arc-length control value indicates that the arc-length is lower than a switching threshold, which second current wave-shape is selected such that the tip on the electrode is at least partly melted back, switching an operating frequency of the lamp from a first frequency value ($f_1$) to a second frequency value ($f_2$), which second frequency value ($f_2$) is higher than the first frequency value ($f_1$), if a first time criterion pertaining to a duration of driving of the lamp in the second operation mode is fulfilled, and switching the operating frequency from the second frequency value ($f_2$) to the first frequency value ($f_1$), if a second time criterion pertaining to a duration of driving of the lamp in the first operation mode is fulfilled.

2. A method according to claim 1, wherein the operating voltage of the lamp is used as the arc-length control value and the lamp is driven in the first operation mode when the operating voltage of the lamp is higher than a switching threshold voltage value, and the lamp is driven in the second operation mode when the operating voltage is lower than a switching threshold voltage value.

3. A method according to claim 1, wherein the first time criterion comprises a first time limit ($\Delta t_1$) pertaining to a time period ($\Delta t_n$), in which the lamp is continuously driven in the second operation mode ($OM_n$), and/or the second time criterion comprises a second time limit ($\Delta t_2$) pertaining to a time period ($\Delta t_p$), in which the lamp is continuously driven in the first operation mode.

4. A method according to claim 3, wherein a timer is reset and started when the operation mode is switched between the first and the second operation mode, and wherein the operating frequency is switched between the second frequency value ($f_2$) and the first frequency value ($f_1$) if a time value measured by the timer is equal to or exceeds a predefined timer value limit.

5. A method according to claim 1, wherein
a first total dwell-time, in which the lamp is driven in the first operation mode ($OM_p$), and a second total dwell-time, in which the lamp is driven in the second operation mode ($OM_n$), are measured, and
the operating frequency of the lamp is switched from the first frequency value ($f_1$) to the second frequency value ($f_2$) if the difference between the second total dwell-time and the first total dwell-time is equal to or exceeds a predefined first value, and
the operating frequency of the lamp is switched from the second frequency value ($f_2$) to the first frequency value ($f_1$) if the difference between the first total dwell-time and the second total dwell-time is equal to or exceeds a predefined second value.

6. A method according to claim 5, wherein
a counter is configured to count in one direction, while the lamp is being driven in the first operation mode, and to count in the reverse direction, while the lamp is being driven in the second operation mode,
and the operating frequency of the lamp is switched between the first frequency value ($f_1$) and the second frequency value ($f_2$) in one direction if the counter reading is equal to or exceeds a predefined upper value and in the reverse direction if the counter reading is equal to or less than a predefined lower value.

7. A method according to claim 1, wherein the lamp is driven in a third operation mode ($OM_{PWM}$) if the arc-length control value indicates that the arc-length is lower than a contingency threshold.

8. A method according to claim 1, wherein
the operation mode is switched from the second operation mode to another operation mode if a third time criterion pertaining to a duration of driving of the lamp in the second operation mode is fulfilled, and/or
the operation mode is switched from the first operation mode to another operation mode if a fourth time criterion pertaining to a duration of driving of the lamp in the first operation mode is fulfilled.

9. A method according to claim 8, wherein
the third time criterion pertains to a duration of driving of the lamp in the second operation mode with the second operation frequency ($f_2$), and/or
the fourth time criterion pertains to a duration of driving of the lamp in the first operation mode with the first operation frequency ($f_1$).

10. A method according to claim 1, wherein an intentional peak-pulse current in the first current wave-shape is forced directly preceding a commutation time instant and in the second current wave-shape the intentional peak-pulse current is shifted away from the commutation time instant.

11. A method according to claim 10, wherein the peak-pulse current retains its position in phase, and the commutation time instant is shifted, when a switch-over is made between the first and the second operation mode.

12. A method according to claim 1, wherein the second frequency value ($f_2$) is a multiple integer of the first frequency value ($f_1$).

13. A method for driving an image rendering system, in which a lamp is driven according to claim 1, wherein the first and the second current wave-shape and the first and the second frequency are synchronized to a display operation mode and/or colour generation cycle.

14. A driving unit for driving a gas-discharge lamp comprising:
a commutation unit for applying an alternating current to the gas-discharge lamp,
a wave forming unit for forming the current wave-shape applied to the gas-discharge lamp,
an arc-length monitoring unit, for monitoring an arc-length control value, indicating the current length of a discharge arc of the gas-discharge lamp,
a control unit,
which control unit controls the wave forming unit such that
the lamp is driven in a first operation mode with a first current wave-shape when the arc-length control value indicates that the arc-length is higher than a switching threshold, which first current wave-shape is selected to result in a tip growing on an electrode of the lamp, and
the lamp is driven in a second operation mode with a second current wave-shape when the arc-length control value indicates that the arc-length is lower than a switching threshold, which second current wave-shape is selected such that the tip on the electrode is at least partly melted back, and which control unit controls the commutation unit such that
an operating frequency of the lamp is switched from a first frequency value ($f_1$) to a second frequency value ($f_2$), which second frequency value ($f_2$) is higher than the first frequency value ($f_1$), if a first time criterion pertaining to a duration of driving of the lamp in the second operation mode is fulfilled, and
the operating frequency is switched from the second frequency value ($f_2$) to the first frequency value ($f_1$), if a second time criterion pertaining to a duration of driving of the lamp in the first operation mode is fulfilled.

* * * * *